United States Patent
Schwindt

(10) Patent No.: US 10,604,149 B2
(45) Date of Patent: Mar. 31, 2020

(54) ALERT REDUCTION IN VEHICLES USING MAP DATA

(71) Applicant: Robert Bosch GmbH, Stuttgart (DE)

(72) Inventor: Oliver Schwindt, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 228 days.

(21) Appl. No.: 15/474,568

(22) Filed: Mar. 30, 2017

(65) Prior Publication Data

US 2018/0281783 A1    Oct. 4, 2018

(51) Int. Cl.
| | |
|---|---|
| *B60W 30/09* | (2012.01) |
| *B60W 50/14* | (2012.01) |
| *G01S 19/42* | (2010.01) |
| *B60W 40/114* | (2012.01) |
| *B60W 40/072* | (2012.01) |
| *B60W 10/18* | (2012.01) |
| *B60W 40/02* | (2006.01) |

(52) U.S. Cl.
CPC ............ *B60W 30/09* (2013.01); *B60W 10/18* (2013.01); *B60W 40/02* (2013.01); *B60W 40/072* (2013.01); *B60W 40/114* (2013.01); *B60W 50/14* (2013.01); *G01S 19/42* (2013.01); *B60W 2050/143* (2013.01); *B60W 2420/40* (2013.01); *B60W 2420/52* (2013.01); *B60W 2420/54* (2013.01); *B60W 2520/06* (2013.01); *B60W 2550/10* (2013.01); *B60W 2550/146* (2013.01); *B60W 2550/402* (2013.01); *B60W 2550/406* (2013.01); *B60W 2710/18* (2013.01)

(58) Field of Classification Search
CPC ....... G01S 19/42; B60W 30/09; B60W 10/18; B60W 40/02; B60W 40/072; B60W 40/114; B60W 40/5014; B60W 2050/143; B60W 2420/40; B60W 2420/52; B60W 2420/54; B60W 2520/06; B60W 2550/10; B60W 2550/146; B60W 2550/402; B60W 2550/406; B60W 2710/18; B60W 50/14; B60W 2450/40
USPC ......................................................... 701/41
See application file for complete search history.

(56) References Cited

U.S. PATENT DOCUMENTS

| | | | | |
|---|---|---|---|---|
| 5,341,344 | A | * | 8/1994 | O'Brien ................. B60Q 9/006 340/904 |
| 6,832,156 | B2 | | 12/2004 | Farmer |
| 8,577,552 | B1 | | 11/2013 | Smit |
| 9,297,892 | B2 | | 3/2016 | Smith et al. |
| 9,321,461 | B1 | * | 4/2016 | Silver ............... B60W 30/0956 |
| 2006/0190124 | A1 | * | 8/2006 | Makela .................. G05D 1/028 700/213 |

(Continued)

*Primary Examiner* — Paula L Schneider
(74) *Attorney, Agent, or Firm* — Michael Best & Friedrich LLP

(57) ABSTRACT

A method and system for identifying an object as a potential collision hazard for a vehicle. The system performs a method that includes sensing an object in a forward direction of travel of the vehicle with a sensor and determining a location of the vehicle. The method includes estimating an amount of curvature of a road segment associated with the location based on predetermined map data and generating, via an electronic processor, a reaction area based on the amount of curvature of the road segment. The method also includes identifying the object as a potential collision hazard when the object is located within the reaction area.

20 Claims, 7 Drawing Sheets

(56) References Cited

U.S. PATENT DOCUMENTS

| | | | |
|---|---|---|---|
| 2007/0129891 A1* | 6/2007 | Yano | B60T 7/22 |
| | | | 701/301 |
| 2010/0125386 A1 | 5/2010 | Ibrahim | |
| 2011/0098922 A1 | 4/2011 | Ibrahim | |
| 2015/0025784 A1 | 1/2015 | Kastner et al. | |
| 2018/0333869 A1* | 11/2018 | Ding | B25J 5/00 |

* cited by examiner

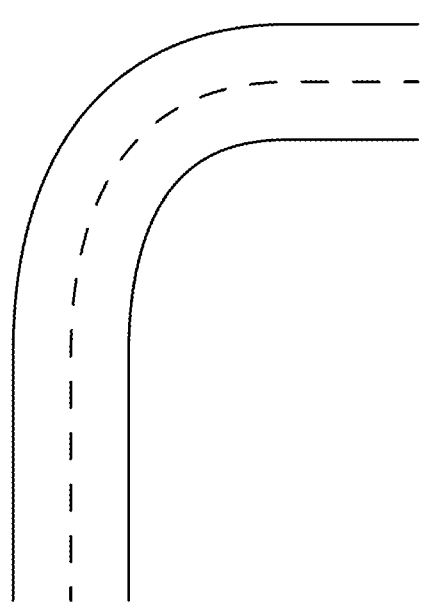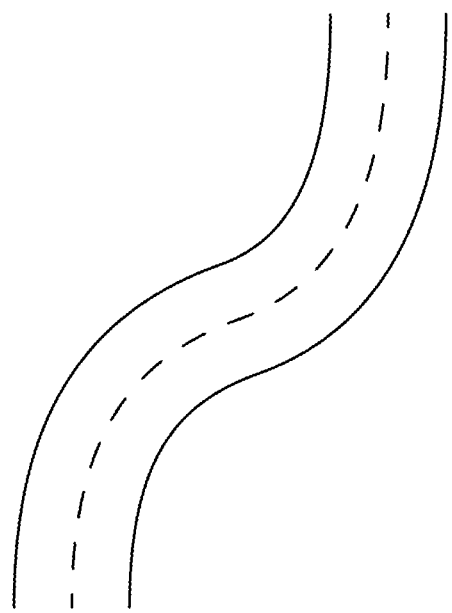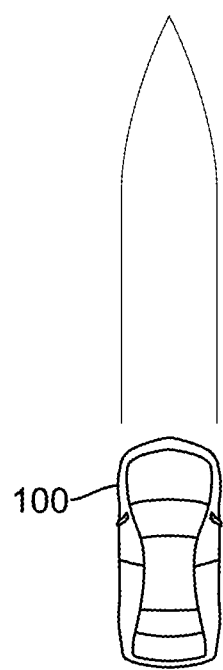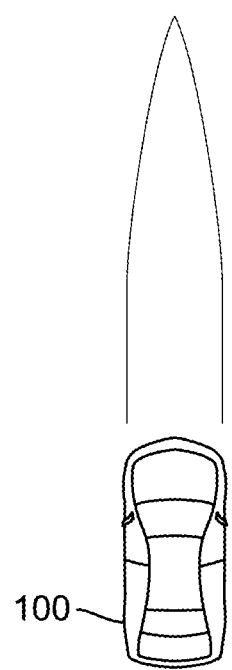
Fig. 5CFig. 5D

US 10,604,149 B2

ALERT REDUCTION IN VEHICLES USING MAP DATA

BACKGROUND

Some modern vehicles include automated systems that provide warnings and automated stopping when objects are detected in the path of travel of the vehicle. In some instances, vehicles include systems that provide forward collision warnings when a vehicle, a pedestrian, or a stationary object is detected within the path of travel of the vehicle. Similarly, some vehicles include systems that provide automated stopping when these objects are detected and when they pose an immediate risk of collision. These systems include sensors with a field of view of the path of travel of the vehicle. Based on data received from the sensors, a controller determines if the risk of collision is sufficient to warrant a collision warning or automated braking.

In some cases, the warnings and automated braking functions occur too frequently and in situations where there is a low risk of collision. This may occur due to limitations inherent in the automated systems to accurately analyze every driving situation. For example, in a situation where a driver is travelling on a straight road that has an approaching curve, the automated systems may undesirably react to a stationary object such as a tree or road sign along the side of the roadway when the driver is following the roadway.

SUMMARY

Embodiments provide an automated system that reduces undesirable forward collision warnings and automated braking events by adapting a reaction area based on map data regarding the roadway being travelled.

In particular, one embodiment provides a method of identifying an object as a potential collision hazard for a vehicle. The method includes sensing an object in a forward direction of travel of the vehicle with a sensor and determining a position of the vehicle. The method further includes estimating an amount of curvature of a road segment associated with the position of the vehicle based on predetermined map data and generating, via an electronic processor, a reaction area based on the amount of curvature of the road segment. The method also includes identifying the object as a potential collision hazard when the object is located within the reaction area.

Another embodiment provides a system for identifying an object as a potential collision hazard for a vehicle. The system includes a sensor with a field of view that extends in a forward direction of travel of the vehicle, a global positioning system, and an electronic processor communicatively connected to the sensor and the global positioning system. The electronic processor is configured to detect an object in the forward direction of travel of the vehicle and determine a position of the vehicle using the global positioning system. The electronic processor is also configured to estimate an amount of curvature of a road segment associated with the position of the vehicle based on predetermined map data and generate a reaction area based on the amount of curvature of the road segment. The electronic processor is further configured to identify the object as a potential collision hazard when the object is located within the reaction area.

Other aspects, features, and embodiments will become apparent by consideration of the detailed description and accompanying drawings.

BRIEF DESCRIPTION OF THE DRAWINGS

FIGS. 5A-5D are examples of road segments and reaction areas associated with each of the road segments according to one embodiment.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
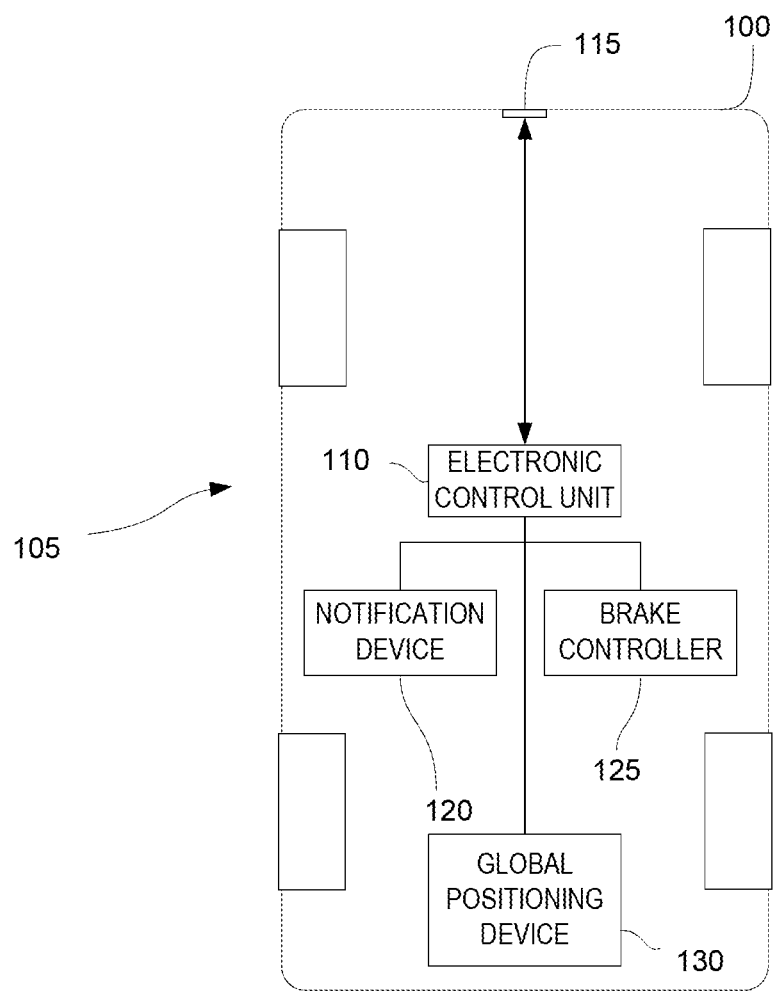
FIG. 1 is a block diagram of a vehicle equipped with a system for identifying an object as a potential collision hazard for the vehicle according to one embodiment.

FIG. 1 illustrates an embodiment of a vehicle 100 equipped with a system 105 for identifying objects as potential collision hazards. The vehicle 100, although illustrated as a four-wheeled vehicle, encompasses various types and designs. For example, the vehicle 100 may include an automobile, a motorcycle, a truck, a bus, a semi-tractor, and others. In the example illustrated, the system 105 includes an electronic control unit (ECU) 110, at least one sensor 115, a notification device 120, a brake controller 125, and a global positioning system (GPS) 130. These components are described in more detail below.

The electronic control unit 110 may be communicatively connected to the sensor 115, the notification device 120, the brake controller 125, and the global positioning system 130 via different and various mechanisms or protocols. For example, the electronic control unit 110 and the sensor 115 may be directly wired, wired through a communication bus, or wirelessly connected (for example, via a wireless network). The electronic control unit 110 is configured to, among other things, receive information from the sensor 115 regarding an area in a forward direction of travel of the vehicle 100, generate notifications to send to the notification device 120, and generate an emergency braking request to send to the brake controller 125.

The sensor 115, although illustrated as a single sensor for simplicity, may include various types and styles of sensors. For example, the sensor 115 may include one or more sensors and sensor arrays that are configured to use radar, lidar, ultrasound, infrared, and others. The sensor 115 may also include one or more optical cameras. In some embodiments, the sensor 115 is positioned with a field of view that includes a forward direction from the vehicle 100. The sensor 115 is configured to capture positional information about objects external to the vehicle 100 and to send the positional information to the electronic control unit 110.

The notification device 120 may be of various different types and use various different technologies. In one example, the notification device 120 is mounted within the vehicle 100 and viewable by a user of the vehicle 100 (for example, mounted on the console, the dashboard, or integrated within a heads-up display). The notification device 120 may include a display screen, warning lights, icons, and others that provide a visual indication to a driver of the vehicle 100. In some embodiments, the notification device 120 is integrated with other components such as within a navigation system. In some embodiments, the notification device 120 includes one or more audial, visual, and haptic alert devices.

The brake controller 125 is configured to receive emergency braking instructions from the electronic control unit 110 and to activate a braking system of the vehicle 100 based on these instructions. In some embodiments, the electronic control unit 110 and the brake controller 125 are integrated into one electronic control unit that performs the functionality of both systems.

Figure 2:
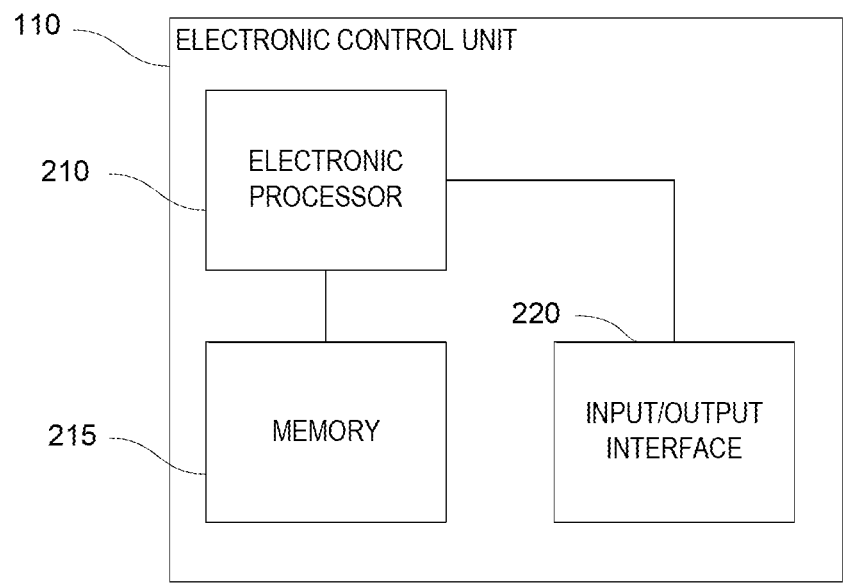
FIG. 2 is a block diagram of an electronic control unit of the system of FIG. 1 according to one embodiment.

FIG. 2 is a block diagram of an electronic control unit 110 of the system 105 according to one embodiment. The electronic control unit 110 includes a plurality of electrical and electronic components that provide power, operational control, and protection to the components and modules within the electronic control unit 110. The electronic control unit 110 includes, among other things, an electronic processor 210 (such as a programmable electronic microprocessor, microcontroller, or similar device), a memory 215 (for example, non-transitory, machine readable memory), and an input/output interface 220. In some embodiments, the electronic control unit 110 includes additional, fewer, or different components. For example, the electronic control unit 110 may be implemented in several independent electronic control units or modules each configured to perform specific steps or functions of the electronic control unit 110.

The electronic processor 210, in coordination with the memory 215, the input/output interface 220, and other components of the electronic control unit 110, is configured to perform the processes and methods discussed herein. For example, the electronic processor 210 is configured to retrieve from memory 215 and execute, among other things, instructions related to receiving sensor data from the sensor 115, generating notifications for the notification device 120, and generating a braking signal for the brake controller 125. The input/output interface 220 may include one or more input and output modules for communicating with the other components of the system 105 as well as other components of the vehicle 100. For example, the input/output interface 220 is configured to communicate with the sensor 115, the notification device 120, and the brake controller 125.

The electronic processor 210 is configured to determine a reaction area. The reaction area defines an area located within a portion of the field of view of the sensor 115. When objects are located within the reaction area, they pose a significantly greater risk of collision with the vehicle 100 than objects outside of the reaction area. The electronic processor 210 monitors the reaction area for objects and responds to objects within the reaction area. By default, the reaction area may form a rectangular shape and extend forward from the vehicle 100 in straight parallel lines about the width of the vehicle 100. The length (i.e., the distance from the vehicle 100) of the shape may vary depending on the speed of the vehicle 100. For example, as the speed of the vehicle 100 increases the reaction area may be increased based on an increase in stopping distance. In addition, the shape of the reaction area may be varied based on the direction that the vehicle 100 is travelling. For example, the electronic processor 210 may determine that the vehicle 100 is curving based on the vehicle's sensors including a yaw-rate sensor, an accelerometer, a steering angle sensor, or some combination of the foregoing. The electronic processor 210 may adjust the reaction area to curve based on the direction of travel of the vehicle 100. Once the reaction area is determined, the electronic processor 210 performs emergency actions when objects are detected within the reaction area. In one embodiment, the electronic processor 210 generates a forward collision warning when an object is detected within the reaction area. In another embodiment, the electronic processor 210 generates an emergency braking signal when an object is detected within the reaction area.

It should be noted, that the electronic processor 210 may receive multiple signals from multiple sensors that each convey information about external objects including distance, position, speed, angles, object properties, object types, and others. The electronic processor 210 may sort the information by determining which objects are within the reaction area and which objects are located outside of the reaction area. The electronic processor 210 may reduce processing time and complexity by only analyzing potential risk of collision with objects within the reaction area. As a consequence, the electronic processor 210 may then only activate the collision warning or emergency braking when the objects are within the reaction area.

In some embodiments, the electronic processor 210 determines the reaction area based solely on the map data and the speed of the vehicle 100. An example method for this embodiment is described with reference to FIG. 3. In other embodiments, the reaction area is determined based on the speed of the vehicle 100 and the direction of travel of the vehicle 100 and then is adjusted based on the map data. An example method for this case is described with reference to FIG. 4. In yet other embodiments, the electronic processor 210 simultaneously determines the reaction area based on the map data, the speed of the vehicle 100, and the direction of travel of the vehicle 100.

Figure 3:
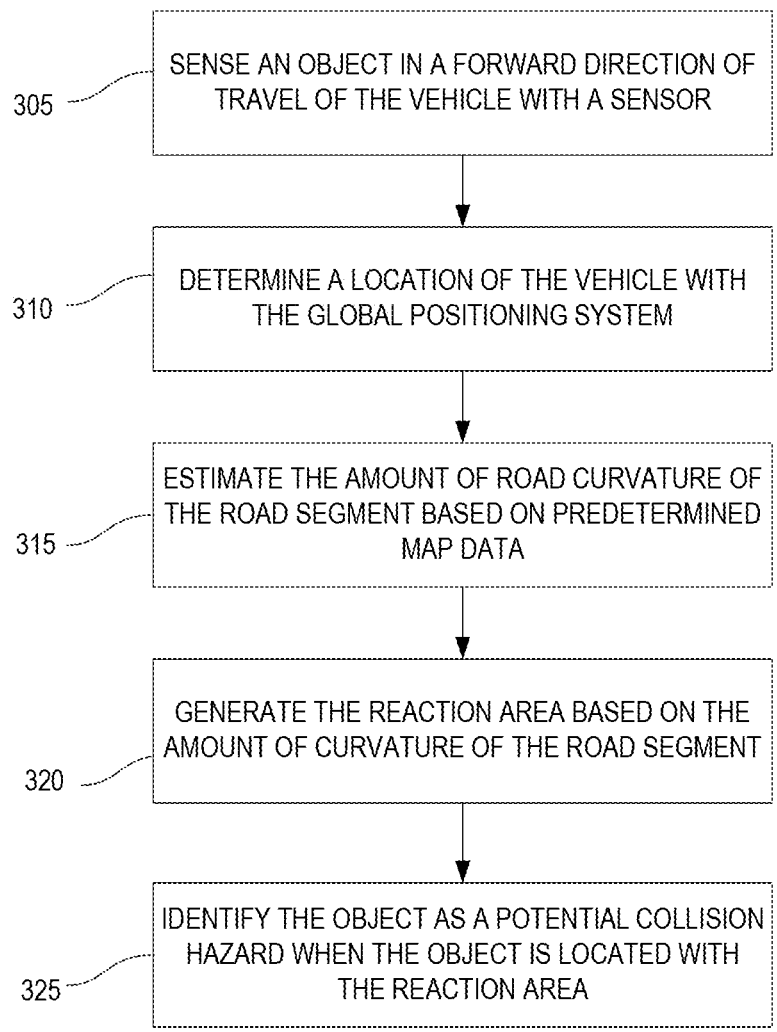
FIG. 3 is a flowchart of a method of operating the system of FIG. 1 according to one embodiment.

FIG. 3 is a flowchart of a method of identifying objects as potential collision hazards according to one embodiment. In the illustrated method, the sensor 115 senses an object in a forward direction of travel of the vehicle 100 (block 305). The sensor 115 then transmits information about the object including the positional relationship with the vehicle 100 to the electronic processor 210.

The electronic processor 210 determines a location of the vehicle 100 with the global positioning system 130 (block 310). The electronic processor 210 then estimates the amount of road curvature of the road segment associated with the location of the vehicle 100 based on predetermined map data (block 315). This may include determining the location of the vehicle 100 with respect to the map data based on the determined position. In some embodiments, the electronic processor 210 is configured to access navigation-grade maps stored within the electronic control unit 110 or stored externally (for example, at a remote server). The electronic processor 210 then determines the appropriate road segment from the map data based on the vehicle's current position. The road segment may be selected as starting from the vehicle's current position and extending for a length approximately equal to the field of view of the sensor 115. In other cases, the road segment may be selected as a predetermined length centered on the approximate location of the vehicle 100 as determined by GPS. In some embodiments, information about road curvature may be included within the predetermined map data. In other embodiments, the electronic processor 210 calculates the road curvature based on analysis of the map data.

The electronic processor 210 then generates the reaction area based on the amount of curvature of the road segment (block 320). As described above, the reaction area may cover an area extending forward from the vehicle 100, be approximately the width of the vehicle 100, and be straight or curved. Generating the reaction area may include generating a shape defining the reaction area that is dependent on the amount of left road curvature of the road segment and dependent on the amount of right road curvature of the road segment. For example, the shape of the reaction area may include curved sides that vary in proportion to the degree of road curvature.

Once the reaction area is determined, the electronic processor 210 analyzes the information provided by the sensor 115. Based on the information, the electronic processor 210 identifies objects as a potential collision hazards when the objects are located with the reaction area (block 325).

Figure 4:
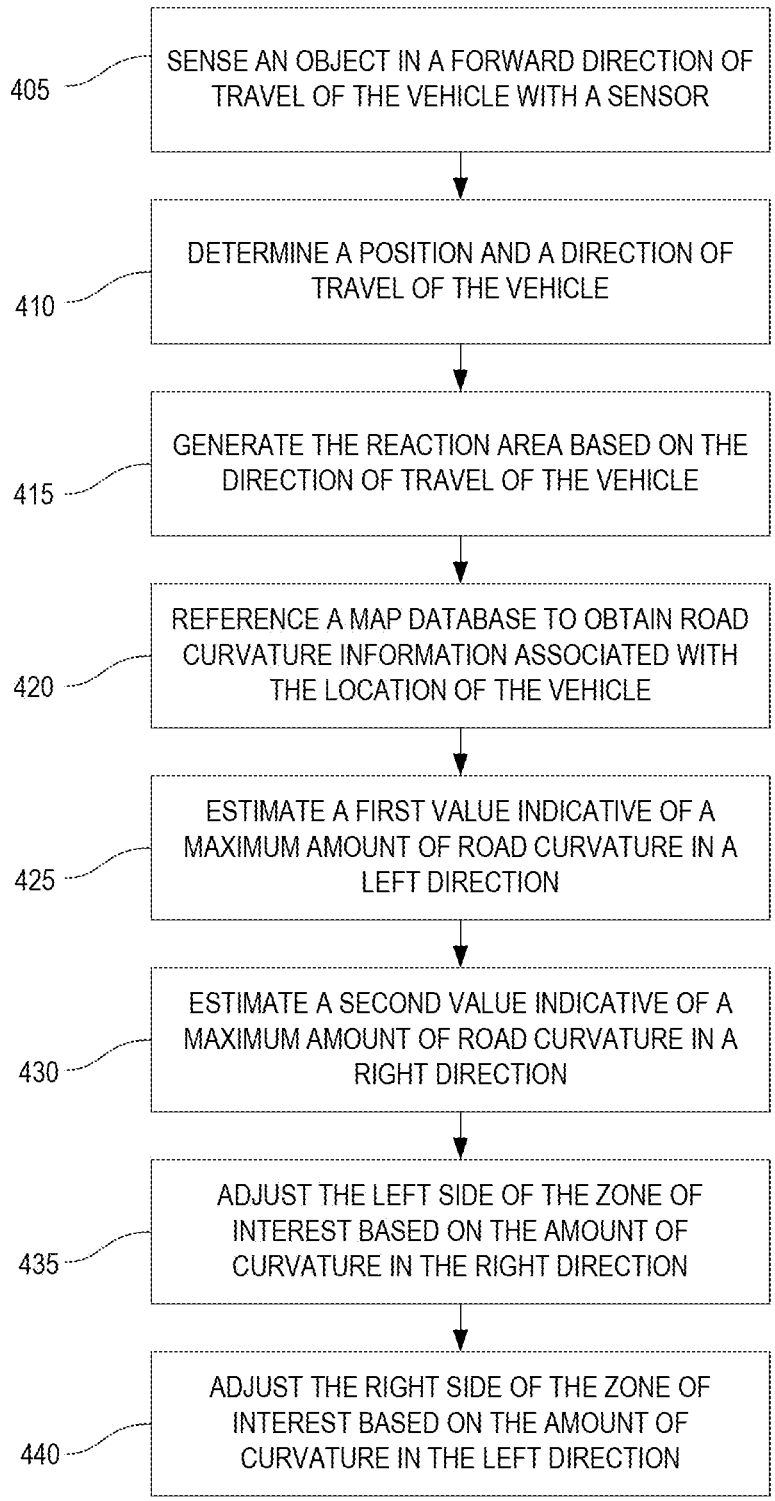
FIG. 4 is a flowchart of method of operating the system of FIG. 1 according to another embodiment.

FIG. 4 illustrates another method of identifying objects as potential collision hazards. In this example, the sensor 115 senses an object in a forward direction of travel of the vehicle 100 (block 405). The electronic processor 210 determines a position and a direction of travel of the vehicle 100 (block 410). The electronic processor 210 generates the reaction area based on the direction of travel of the vehicle 100 (block 415). In this way, the electronic processor 210 sets the reaction area to compensate for a steering angle of the vehicle 100. As mentioned above, the electronic processor 210 may also generate the reaction area based at least in part on the speed of the vehicle 100.

The electronic processor 210 estimates a first value indicative of a maximum amount of road curvature in a left direction (block 425), and estimates a second value indicative of a maximum amount of road curvature in a right direction (block 430). After generating the reaction area, the electronic processor 210 subsequently adjusts the left side of the reaction area based on the amount of curvature in the right direction (435), and subsequently adjusts the right side of the reaction area based on the amount of curvature in the left direction (block 440). In this way, the shape of the reaction area is reduced when curves are present.

Figures 5A, 5B:
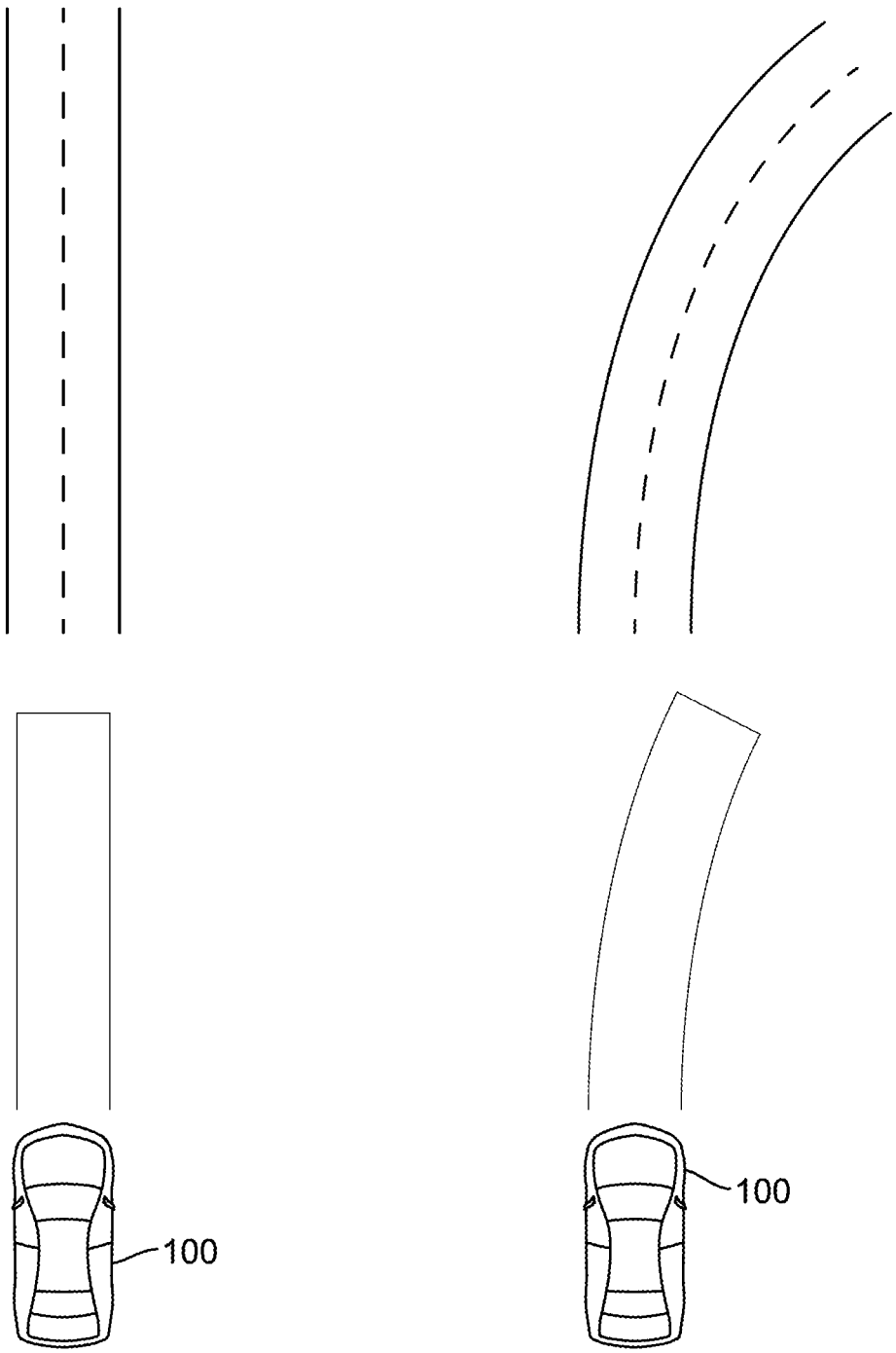

FIGS. 5A-5D illustrate several different examples of road segment curvature and reaction areas associated with each of the different examples. The top portions of FIGS. 5A-5D illustrate the various types of road curvature in the path of travel of the vehicle 100, and which the electronic processor 210 determines from the map data. In particular, FIG. 5A illustrates a road segment that is straight. FIG. 5B illustrates a road segment with a constant value of road curvature. FIG. 5C illustrates a road segment with a straight section, followed by a curved section, followed by another straight section. FIG. 5D illustrates an s-curve. The electronic processor 210 determines a different shape of the reaction area based on each of these road segment examples. The bottom portions of FIGS. 5A-5D illustrate the reaction areas that are generated by the electronic processor 210 for each of the road segments illustrated on the top portions.

For a straight road segment (FIG. 5A), the electronic processor 210 determines the reaction area as a shape with straight sides pointing in the forward direction of travel. For a road segment with a constant curvature (FIG. 5B), the electronic processor 210 determines the reaction area as having a constant curvature that may be equal to the constant curvature of the road segment. In this way, the reaction area may bend in a left direction when the yaw angle of the vehicle 100 is in the left direction and may bend in a right direction when the yaw angle of the vehicle 100 is in the right direction. For the road segment with curved and straight portions (FIG. 5C), the electronic processor 210 determines the maximum road curvature at a point with the greatest right curvature. The electronic processor 210 determines the maximum left curvature as zero. Based on these determinations, the electronic processor 210 sets the reaction area having a straight edge on the right side corresponding to the straight portion of the road segment and a curved edge on the left side corresponding to the curved portion of the road segment. For the road segment with an s-curve (FIG. 5D), the electronic processor 210 determines the maximum curvature in the right direction and the maximum curvature in the left direction as positive values. Based on the maximum curvatures, the electronic processor 210 determines the reaction area as having curved edges on both sides. These curved edges may be proportional to the value of the maximum curvatures for each side.

As a consequence of the reaction areas depicted in FIGS. 5A-5D, the electronic processor 210 reduces false activations of the forward collision warning and the emergency braking features of the vehicle 100. In the example of FIG. 5A, the reaction area is set to a maximum or default value when false activations are unlikely to occur. Since objects on the side of the roadway are unlikely to be detected by the electronic processor 210 when the road segment is straight and the vehicle 100 is pointed forwards, the reaction area is set to a maximum. In FIG. 4B, the reaction area is set to follow the estimated road curvature. In this case, when objects are located to the left side of the roadway, they may not be located within the reaction area even when they are located in the direction that the vehicle 100 is facing. In FIG. 4C, the reaction area curves inward on the left side to avoid false activations that could be caused by objects on the left side of the road segment. For example, when the vehicle 100 is on the straight portion of the road segment approaching the curve, objects off to the left side of the road segment on the curve may not be inside the reaction area due to the inward curve of the reaction area. In FIG. 5D, the reaction area is curved inward on both the left and the right sides. In this case, activations from objects off to the left side and off to the right side of the roadway will be reduced.

In some embodiments, the electronic processor 210 determines a minimum and a maximum curvature in the left direction and a minimum and maximum curvature in the right direction. For example, FIG. 5B has a minimum and maximum right curvature equal to the constant road curvature and a minimum and maximum left curvature equal to zero. FIG. 5C has a maximum road curvature in the right direction at the point in the curve that requires the sharpest turn and a minimum road curvature in the right direction of zero at any point in the straight portion of the road segment. In this example, both the minimum and maximum curvature in the left direction is equal to zero. Similar to as above, the electronic processor 210 may set the left side of the reaction area with an inward curve equal the maximum road curvature in the right direction and may set the right side of the reaction area with an inward curve equal the maximum road curvature in the left direction.

Figure 6:
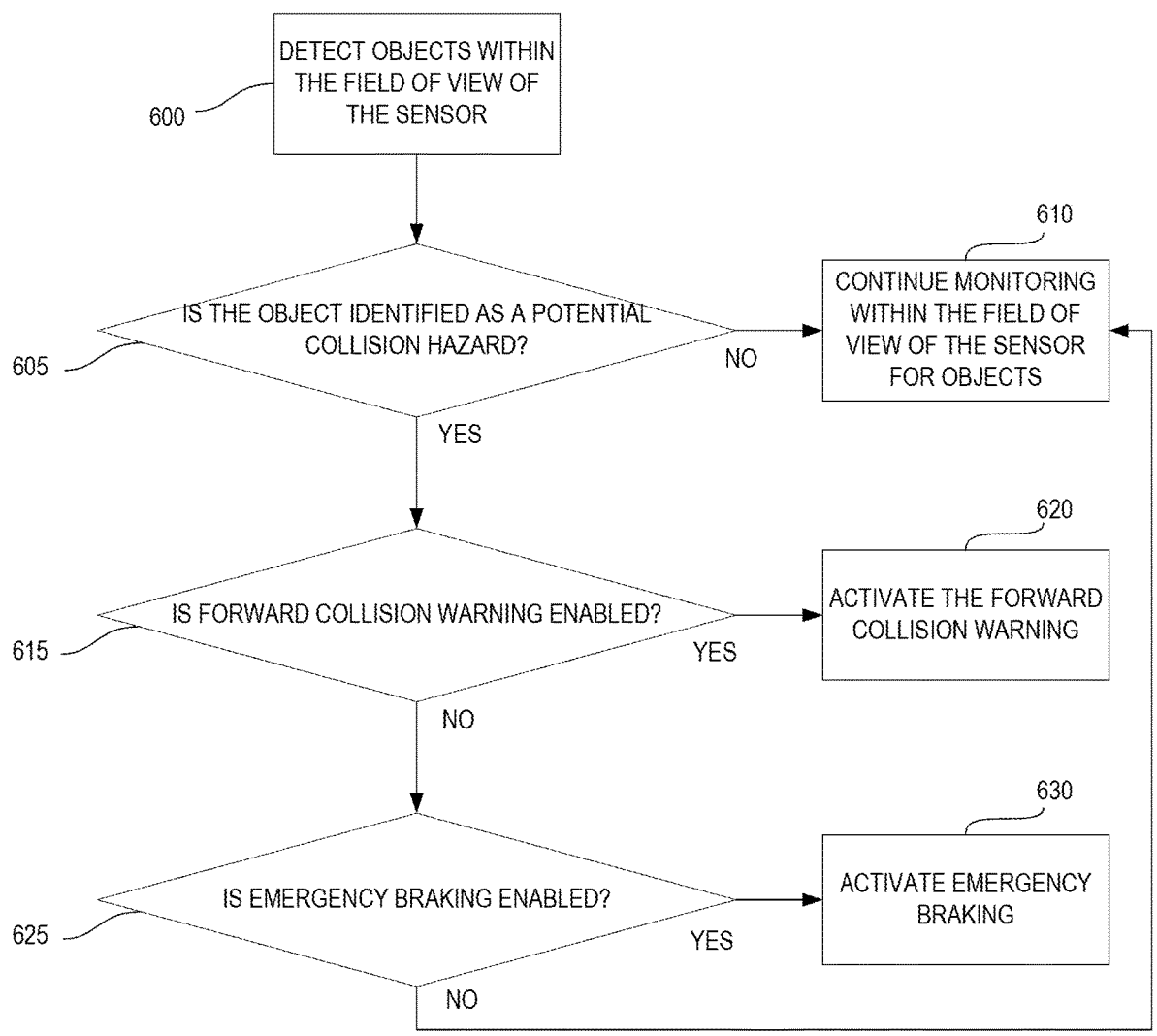
FIG. 6 is a flowchart of a method of activation of forward collision warning, emergency braking, or both using the system of FIG. 1 according to one embodiment.

Once the reaction area is determined, the electronic processor 210 analyzes the information provided by the sensor 115 to determine whether objects are within the reaction area. FIG. 6 illustrates a method of activation of forward collision warning, emergency braking, or both based on the information. It should be noted that other vehicle systems may utilize the reaction area for purposes other than collision warnings and emergency braking. In the example illustrated, the electronic processor 210 detects objects within the field of view of the sensor 115 (block 600). The electronic processor 210 determines whether the object is within the reaction area, and if so, identifies the object as a potential collision hazard (block 605). However, in some embodiments, the electronic processor 210 may consider additional factors relating to the object including size, position, movement, and others before identifying the object as a collision hazard. When the object is not within the reaction area, the electronic processor 210 does not activate forward collision warning or emergency braking, but rather continues to monitor the field of view of the sensor 115 for objects (block 610). When the object is identified as a collision hazard, the electronic processor 210 determines whether forward collision warning is enabled on the vehicle 100 (block 615). When forward collision warning is enabled, the electronic processor 210 activates the forward collision warning (block 620). The electronic processor 210 also determines whether emergency braking is enabled on the vehicle 100 (block 625). When emergency braking is enabled, the electronic processor 210 activates the emergency braking (block 630).

Various features, advantages, and embodiments are set forth in the following claims.

What is claimed is:

1. A method of identifying an object as a potential collision hazard for a vehicle, the method comprising:
   sensing the object within a forward direction of travel of the vehicle with a sensor;
   determining a position of the vehicle;
   estimating an amount of curvature of a road segment associated with the position of the vehicle based on predetermined map data;
   generating, via an electronic processor, a reaction area based on the amount of curvature of the road segment, wherein the reaction area is a dynamically adjustable area located within a portion of a field of view of the sensor that is dynamically adjusted based on the amount of curvature of the road segment; and
   identifying the object as a potential collision hazard when the object is located within the reaction area.

2. The method according to claim 1, wherein estimating the amount of curvature of the road segment includes estimating an amount of left road curvature and an amount of right road curvature of the road segment based on the predetermined map data, and
   wherein generating the reaction area includes generating a shape defining the reaction area that is dependent on the amount of left road curvature of the road segment and dependent on the amount of right road curvature of the road segment.

3. The method according to claim 1, wherein estimating the amount of curvature of the road segment includes estimating a first value indicative of a maximum amount of road curvature in a left direction and estimating a second value indicative of a maximum amount of road curvature in a right direction.

4. The method according to claim 3, wherein generating the reaction area includes generating a shape defining the reaction area with a right side generated based on the first value.

5. The method according to claim 3, wherein generating the reaction area includes generating a shape defining the reaction area with a left side generated based on the second value.

6. The method according to claim 1, further comprising determining a direction of travel of the vehicle, and generating the reaction area based at least in part on the direction of travel of the vehicle.

7. The method according to claim 6, wherein generating the reaction area includes
   generating the reaction area based on the direction of travel of the vehicle; and
   subsequently, adjusting the reaction area based on the amount of curvature of the road segment.

8. The method according to claim 6, wherein
   determining the direction of travel of the vehicle includes determining a yaw angle of the vehicle; and
   wherein generating the reaction area based at least in part on the direction of travel of the vehicle includes generating a reaction area that bends in a left direction when the yaw angle of the vehicle is in the left direction and generating a reaction area that bends in a right direction when the yaw angle of the vehicle is in the right direction.

9. The method according to claim 8, further comprising after generating the reaction area, adjusting a right side of the reaction area based on a maximum amount of road curvature in a left direction.

10. The method according to claim 8, further comprising after generating the reaction area, adjusting a left side of the reaction area based on a maximum amount of road curvature in a right direction.

11. The method according to claim 1, further comprising generating a forward collision warning when the object is identified as a potential collision hazard.

12. The method according to claim 1, further comprising activating a braking system of the vehicle when the object is a potential collision hazard.

13. A system for identifying an object as a potential collision hazard for a vehicle, the system comprising:
   a sensor with a field of view that extends in a forward direction of travel of the vehicle;
   a global positioning system; and
   an electronic processor communicatively connected to the sensor and the global positioning system, the electronic processor configured to
      detect the object in the forward direction of travel of the vehicle;

determine a location of the vehicle using the global positioning system;

estimate an amount of curvature of a road segment associated with the location of the vehicle based on predetermined map data;

generate a reaction area based on the amount of curvature of the road segment, wherein the reaction area is a dynamically adjustable area included within a portion of a field of view of the sensor that is dynamically adjusted based on the amount of curvature of the road segment; and identify the object as a potential collision hazard when the object is located within the reaction area.

14. The system according to claim 13, wherein the electronic processor is further configured to estimate an amount of left road curvature and an amount of right road curvature of the road segment based on the predetermined map data, and generate a shape defining the reaction area that is dependent on the amount of left road curvature of the road segment and dependent on the amount of right road curvature of the road segment.

15. The system according to claim 13, wherein the electronic processor is further configured to estimate a first value indicative of a maximum amount of road curvature in a left direction and estimate a second value indicative of a maximum amount of road curvature in a right direction.

16. The system according to claim 15, wherein the electronic processor is further configured to generate a shape defining the reaction area with a right side generated based on the first value.

17. The system according to claim 15, wherein the electronic processor is further configured to generate a shape defining the reaction area with a left side generated based on the second value.

18. The system according to claim 13, wherein the electronic processor is further configured to determine a direction of travel of the vehicle, and generate the reaction area based at least in part on the direction of travel of the vehicle.

19. The system according to claim 18, wherein the electronic processor is further configured to generate the reaction area based on the direction of travel of the vehicle, and subsequently adjust the reaction area based on the amount of curvature of the road segment.

20. The system according to claim 18, wherein the electronic processor is further configured to determine a yaw angle of the vehicle; and generate a reaction area that bends in a left direction when the yaw angle of the vehicle is in the left direction and generating a reaction area that bends in a right direction when the yaw angle of the vehicle is in the right direction.

* * * * *